United States Patent
Sachdeva

(10) Patent No.: US 11,463,259 B2
(45) Date of Patent: Oct. 4, 2022

(54) SYSTEM AND METHOD FOR MANAGING TRUST AND WEARABLE DEVICE FOR USE THEREWITH

(71) Applicant: Harpreet Sachdeva, New Delhi (IN)

(72) Inventor: Harpreet Sachdeva, New Delhi (IN)

( * ) Notice: Subject to any disclaimer, the term of this patent is extended or adjusted under 35 U.S.C. 154(b) by 149 days.

(21) Appl. No.: 16/890,563

(22) Filed: Jun. 2, 2020

(65) Prior Publication Data
US 2021/0377032 A1    Dec. 2, 2021

(51) Int. Cl.
*H04L 9/32* (2006.01)
*H04L 9/06* (2006.01)
*G06K 19/077* (2006.01)
*G06Q 30/02* (2012.01)

(52) U.S. Cl.
CPC ...... *H04L 9/3234* (2013.01); *G06K 19/07762* (2013.01); *H04L 9/0637* (2013.01); *H04L 9/3228* (2013.01); *G06Q 30/0236* (2013.01)

(58) Field of Classification Search
CPC ... H04L 9/3234; H04L 9/0637; H04L 9/3228; G06K 19/07762; G06Q 30/0236
See application file for complete search history.

(56) References Cited

U.S. PATENT DOCUMENTS

| | | | | |
|---|---|---|---|---|
| 9,424,601 | B2* | 8/2016 | Brosnan | G06Q 30/0224 |
| 2004/0072596 | A1* | 4/2004 | Yamamoto | G06F 3/0485 |
| | | | | 455/566 |
| 2013/0110264 | A1* | 5/2013 | Weast | G04G 17/06 |
| | | | | 700/91 |
| 2015/0378587 | A1* | 12/2015 | Falaki | G06F 3/0346 |
| | | | | 715/747 |
| 2016/0134633 | A1* | 5/2016 | Gaddam | G06Q 50/01 |
| | | | | 726/4 |
| 2016/0335686 | A1* | 11/2016 | AthuluruTlrumala | H04N 21/44222 |
| 2016/0344730 | A1* | 11/2016 | Holz | H04L 63/0853 |
| 2018/0117447 | A1* | 5/2018 | Tran | G06Q 20/02 |
| 2019/0228461 | A1* | 7/2019 | Domokos | G06Q 30/0613 |
| 2021/0211881 | A1* | 7/2021 | Liang | H04W 12/33 |
| 2021/0352134 | A1* | 11/2021 | Bjontegard | G06V 20/20 |
| 2021/0368316 | A1* | 11/2021 | Tiwari | G06Q 20/4014 |

\* cited by examiner

*Primary Examiner* — Jung W Kim
*Assistant Examiner* — Alan Lingqian Kong
(74) *Attorney, Agent, or Firm* — RC Trademark Company

(57) ABSTRACT

Disclosed is a system for managing trust. The system comprises at least one wearable device, at least one terminal device and a server arrangement. The server arrangement is configured to determine occurrence of a first type of event between a wearable device and another wearable device or a second type of event between the wearable device and a terminal device; receive a device ID and a class of each of the at least one wearable device and the at least one terminal device; receive a rating and process the rating to generate updated activity information for each of the wearable device, and the other wearable device or the terminal device; update a profile corresponding to each of the at least one wearable device or the at least one terminal device with the updated activity information and allocate an incentive for the profile based on the updated activity information.

12 Claims, 5 Drawing Sheets

SYSTEM AND METHOD FOR MANAGING TRUST AND WEARABLE DEVICE FOR USE THEREWITH

TECHNICAL FIELD

The present disclosure relates generally to identity management; and more specifically, to systems and methods for managing trust. Furthermore, the present disclosure relates to a wearable device for use with the systems and methods for managing trust.

BACKGROUND

Generally, people interact with innumerable people, purchase products from different product vendors and avail a plurality of services from various service providers during their lifetimes. Such transactions are based on presence of an innate trust between the interacting persons, for example, between a person purchasing a product or availing a service from another person associated with a business establishment. However, as such a trust existing between the interacting persons is not directly quantifiable and therefore, there can arise various problem with the transaction. For example, one or more of the persons may become liable to fraud and/or misappropriation from the other person, one or more of the person may cause overpayment for a product or service associated with the transaction and the like.

Conventionally, various systems and methods have been envisaged to track and consequently, managed trust (or reputation) associated with people. For example, online activity of people on various digital platforms have been tracked to determine trust associated therewith. However, such tracking of the online activity of people corresponds to a limited subset of interactions engaged by people in their daily lives. Thus, the mere tracking of online activity for managing trust associated with people leads to inaccurate and/or unreliable results.

Similarly, attempts have been made to track real-world activities of people through analysis of participation thereof in various loyalty programs associated with different businesses. Again, such an analysis of the participation in various loyalty programs corresponds to a limited subset of the interactions undertaken by people on a daily basis and disregards other (potentially, more important) interactions of people. Thus, conventional systems and methods fail to enable accurate management of trust associated with people.

Therefore, in the light of foregoing discussion, there exists a need to overcome the aforementioned problems associated with management of trust.

SUMMARY

The present disclosure seeks to provide a system for managing trust. The present disclosure also seeks to provide a wearable device for use with the aforesaid system for managing trust. The present disclosure also seeks to provide a method for managing trust.

The present disclosure seeks to provide a solution to the existing problems associated with management of trust. An aim of the present disclosure is to provide a solution that overcomes at least partially the problems encountered in prior art, and provides the system and the method that enables management of trust during various daily interactions of people in a definite, quantifiable and reliable manner.

In one aspect, an embodiment of the present disclosure provides a system for managing trust, the system comprising:
  at least one wearable device comprising a communication unit, a plurality of buttons for providing a rating as per a predefined rating scale and a Near Field Communication (NFC) unit, wherein each wearable device is associated with a unique device identifier (ID), a unique profile indicative of trust and a class among a predefined set of classes;
  at least one terminal device comprising a communication unit and a NFC unit, wherein each terminal device is associated with a unique device ID, a unique profile indicative of trust and a class among the predefined set of classes;
  a server arrangement communicatively coupled to each of the at least one wearable device and the at least one terminal device using the communication unit thereof, wherein the server arrangement comprises a blockchain network having a block for each unique profile and the blockchain network is configured to store a ledger comprising at least activity information for the profile,
and wherein the server arrangement is configured to:
  determine occurrence of a first type of event between a wearable device and another wearable device of the at least one wearable device or a second type of event between the wearable device of the at least one wearable device and a terminal device of the at least one terminal device;
  receive the device ID and the class of each of the at least one wearable device and the at least one terminal device based on the type of event;
  receive a rating provided by the wearable device for the other wearable device or the terminal device based on the type of event;
  process the rating to generate updated activity information for the profile corresponding to each of the wearable device, and the other wearable device or the terminal device based on the type of event, wherein the updated activity information is generated using a weighted average of the provided rating and the corresponding class of the at least one wearable device and the at least one terminal device;
  update the profile on the ledger of the blockchain network with the updated activity information for each of the wearable device, and the other wearable device or the terminal device based on the type of event; and
  allocate an incentive for the profile corresponding to the at least one wearable device and/or the at least one terminal device, based on the updated activity information thereof.

In another aspect, an embodiment of the present disclosure provides a wearable device for use with the system according to claim 1, the wearable device comprising a communication unit, a plurality of buttons for providing a rating as per a predefined rating scale and a Near Field Communication (NFC) unit, wherein the wearable device is implemented as a wristband comprising a first portion and a second portion configured to be operatively coupled to each other, and wherein:
  one end of each of the first portion and the second portion comprises an attachment mechanism for detachable coupling between the first portion and the second portion; and
  another end of the first portion comprises a USB connector and another end of the second portion comprises a USB port, wherein the USB port of the second portion is configured to receive the USB connector of the first portion.

In yet another aspect, an embodiment of the present disclosure provides a method for managing trust in a system comprising at least one wearable device and at least one terminal device, wherein each of the at least one wearable device and the at least one terminal device is associated with a unique device identifier (ID), a unique profile indicative of trust and a class among a predefined set of classes, and wherein the system is implemented using a blockchain network having a block for each unique profile and the blockchain network is configured to store a ledger comprising at least activity information for the profile and wherein the method comprises:

- determining occurrence of a first type of event between a wearable device and another wearable device of the at least one wearable device or a second type of event between the wearable device of the at least one wearable device and a terminal device of the at least one terminal device;
- receiving the device ID and the class of each of the at least one wearable device and the at least one terminal device based on the type of event;
- receiving a rating provided by the wearable device for the other wearable device or the terminal device based on the type of event;
- processing the rating to generate updated activity information for the profile corresponding to each of the wearable device, and the other wearable device or the terminal device based on the type of event, wherein the updated activity information is generated using a weighted average of the provided rating and the corresponding class of the at least one wearable device and the at least one terminal device;
- updating the profile on the ledger of the blockchain network with the updated activity information for each of the wearable device, and the other wearable device or the terminal device based on the type of event; and
- allocating an incentive for the profile corresponding to the at least one wearable device and/or the at least one terminal device, based on the updated activity information thereof.

Embodiments of the present disclosure substantially eliminate or at least partially address the aforementioned problems in the prior art, and enable convenient, reliable and secure management of trust associated with people during various interactions thereof.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
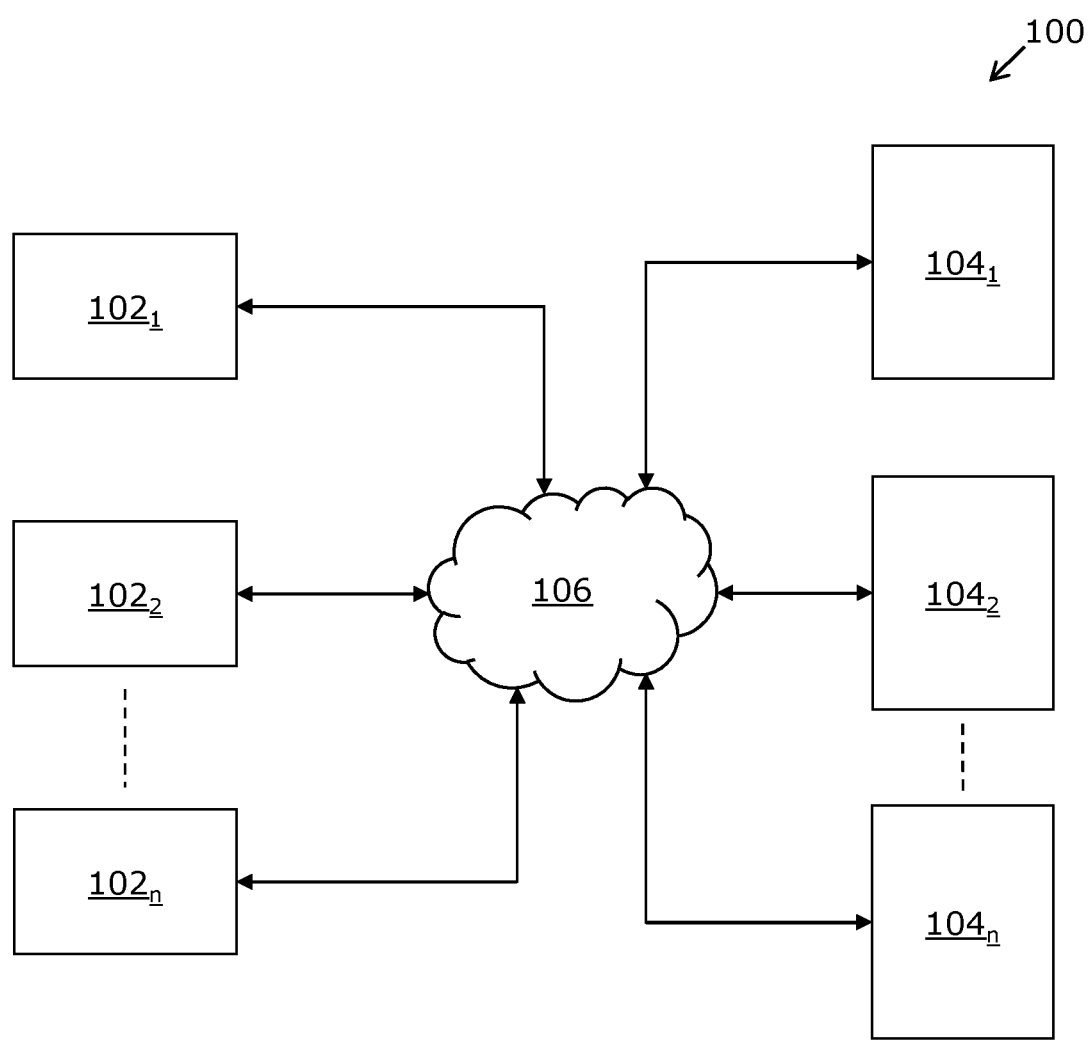
FIG. 1 is a block diagram of a system for managing trust, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for managing trust, the system comprising:

- at least one wearable device comprising a communication unit, a plurality of buttons for providing a rating as per a predefined rating scale and a Near Field Communication (NFC) unit, wherein each wearable device is associated with a unique device identifier (ID), a unique profile indicative of trust and a class among a predefined set of classes;
- at least one terminal device comprising a communication unit and a NFC unit, wherein each terminal device is associated with a unique device ID, a unique profile indicative of trust and a class among the predefined set of classes;
- a server arrangement communicatively coupled to each of the at least one wearable device and the at least one terminal device using the communication unit thereof, wherein the server arrangement comprises a blockchain network having a block for each unique profile and the blockchain network is configured to store a ledger comprising at least activity information for the profile, and wherein the server arrangement is configured to:
  - determine occurrence of a first type of event between a wearable device and another wearable device of the at least one wearable device or a second type of event between the wearable device of the at least one wearable device and a terminal device of the at least one terminal device;

receive the device ID and the class of each of the at least one wearable device and the at least one terminal device based on the type of event;

receive a rating provided by the wearable device for the other wearable device or the terminal device based on the type of event;

process the rating to generate updated activity information for the profile corresponding to each of the wearable device, and the other wearable device or the terminal device based on the type of event, wherein the updated activity information is generated using a weighted average of the provided rating and the corresponding class of the at least one wearable device and the at least one terminal device;

update the profile on the ledger of the blockchain network with the updated activity information for each of the wearable device, and the other wearable device or the terminal device based on the type of event; and allocate an incentive for the profile corresponding to the at least one wearable device and/or the at least one terminal device, based on the updated activity information thereof.

In another aspect, an embodiment of the present disclosure provides a wearable device for use with the system according to claim 1, the wearable device comprising a communication unit, a plurality of buttons for providing a rating as per a predefined rating scale and a Near Field Communication (NFC) unit, wherein the wearable device is implemented as a wristband comprising a first portion and a second portion configured to be operatively coupled to each other, and wherein:

one end of each of the first portion and the second portion comprises an attachment mechanism for detachable coupling between the first portion and the second portion; and another end of the first portion comprises a USB connector and another end of the second portion comprises a USB port, wherein the USB port of the second portion is configured to receive the USB connector of the first portion.

In yet another aspect, an embodiment of the present disclosure provides a method for managing trust in a system comprising at least one wearable device and at least one terminal device, wherein each of the at least one wearable device and the at least one terminal device is associated with a unique device identifier (ID), a unique profile indicative of trust and a class among a predefined set of classes, and wherein the system is implemented using a blockchain network having a block for each unique profile and the blockchain network is configured to store a ledger comprising at least activity information for the profile and wherein the method comprises:

determining occurrence of a first type of event between a wearable device and another wearable device of the at least one wearable device or a second type of event between the wearable device of the at least one wearable device and a terminal device of the at least one terminal device;

receiving the device ID and the class of each of the at least one wearable device and the at least one terminal device based on the type of event;

receiving a rating provided by the wearable device for the other wearable device or the terminal device based on the type of event;

processing the rating to generate updated activity information for the profile corresponding to each of the wearable device, and the other wearable device or the terminal device based on the type of event, wherein the updated activity information is generated using a weighted average of the provided rating and the corresponding class of the at least one wearable device and the at least one terminal device;

updating the profile on the ledger of the blockchain network with the updated activity information for each of the wearable device, and the other wearable device or the terminal device based on the type of event; and allocating an incentive for the profile corresponding to the at least one wearable device and/or the at least one terminal device, based on the updated activity information thereof.

The aforesaid system and method enable management of trust between entities. The system comprises the at least one wearable device that is worn by the entities. Such at least one wearable device enables convenient interaction between the entities, such as, for providing and receiving ratings. Each wearable device comprises the plurality of buttons that enables the entity wearing the corresponding wearable device to easily provide the rating, without necessitating use of any other devices (such as, a mobile device that may already be in use). Thus, the wearable device used by the entities improves user-friendliness, enabling easier and improved adoption of the system by the entities. Furthermore, the system comprises the at least one terminal device, such that each of the terminal device and the at least one wearable device comprises corresponding NFC units therein. The NFC units enable short-range communication between wearable device or between a wearable device and the terminal device, thus, improving ease of interaction and further improving adoption of the system. Moreover, the system comprises the server arrangement that is communicatively coupled to each of the at least one wearable device and the at least one terminal device using communication units included within each of the at least one wearable device and the at least one terminal device. Such a communication unit included within each of the at least one wearable device and the at least one terminal device enables communication thereof with the server arrangement concurrently during interaction between wearable devices (using NFC units therein) or between a wearable device and a terminal device, thereby improving reliability associated with the system. Furthermore, the server arrangement employs the device ID, the class and the rating provided by the wearable device for generating the updated activity information for the profile associated with each of the at least one wearable device and the at least one terminal device. Such use the device ID for generating the updated activity information enables accurate association of the updated activity information to the appropriate wearable device and/or the terminal, based on the interaction between the entities. The use of the class for generating the updated activity information enables to prevent random fluctuations in generation of the updated activity information, such as, due to onetime interactions between the entities. Furthermore, the use of the rating provided by the wearable device for generating the updated activity information for each of the interacting wearable devices or the wearable device and the terminal device involved in an interaction, enables use of real-time information for generating the updated activity information, thereby, improving accuracy and reliability associated with generation of the updated activity information. Moreover, the server arrangement comprises the blockchain network for storing information associated with each interaction of the at least one wearable device and the at least one terminal device. It will be appreciated that such storage of the information within the blockchain network provides improved data-security and enables tamper-proof storage and retrieval of the information. Consequently, the system and the method provide improved and more reliable management of trust between entities.

The present disclosure provides the system for managing trust. The term "trust" as used throughout the present disclosure, relates to a quantitative measure of behavior of an entity. The trust is to be understood to be synonymous with reputation of a person or goodwill associated with a business. The system enables tracking of interactions between entities in a centralized manner. The term "entities" as used throughout the present disclosure, relates to a user having any form of interaction with another user of the system. Such a user can be a living person or a non-living property. For example, the user can be a manager of a business establishment while another user can be the business establishment itself. Consequently, the term "entity" has been used to refer to all such users throughout the present disclosure.

The entity can comprise a person wearing a wearable device (described in detail hereinafter) or a person being responsible for a terminal device (for example, a Point-of-Sale terminal, described in detail hereinafter). It will be appreciated that the person wearing the wearable device can be same as the person responsible for the terminal device. For example, when the entity is a manager of a business, then the manager can wear a wearable device that tracks individual interactions of the person, whereas the manager can be responsible for a terminal device that enables business transactions of a business establishment associated with the manager.

The term "interaction" as used throughout the present disclosure, relates to any financial or non-financial transaction occurring between two or more entities. For example, the financial transactions can comprise monetary transactions, service transactions, property transactions, booking transactions and so forth, while the non-financial transactions can comprise social transactions, voting transactions and the like. Each interaction between the two of more entities can require the entity to provide a feedback following the transaction (described in detail hereinafter). For example, following a social transaction of a dinner between two entities, a first of the two entities may be needed to provide a feedback as a rating for a second of the two entities and similarly, the second entity may be needed to provide a feedback as a rating for the first entity.

The system comprises at least one wearable device. The wearable device is an electronic device comprising hardware and software components therein, that is worn on a body of an entity (such as, when the entity is a living person). The wearable device can be implemented as various devices, for example, as an armband, a necklace, an anklet, a pair of spectacles and so forth. In a preferable embodiment of the present disclosure, the wearable device is implemented as a wristband (described in detail hereinafter).

Furthermore, each of the at least one wearable device comprises a communication unit. The communication unit is an electronic component of the wearable device that can be implemented as a combination of hardware and software components, such that the communication unit enables communication of the wearable device with other electronic devices. In an embodiment, the communication unit is implemented as a wireless transceiver that is known at the time of filing, or as later developed. The communication unit enables communication of digital information from the wearable device using one or more data communication networks. The one or more data communication networks may be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

Moreover, each of the at least one wearable device comprises a plurality of buttons for providing a rating as per a predefined rating scale. The term "rating scale" as used throughout the present disclosure, relates to a definite range of values for grading an interaction between two entities, such that each value within the range of values corresponds to a predetermined amount of satisfaction of the entity with respect to the interaction. In one example, the predefined rating scale can be a number scale between 1 and 10 or a numerical scale between 1 and 100. In another example, the predefined rating scale can be a star-based scale comprising of five or ten stars, such that a value of one star corresponds to a minimum amount of satisfaction achieved by an entity during an interaction whereas a value of ten stars corresponds to a maximum amount of satisfaction achieved by the entity during the interaction.

Furthermore, the wearable device comprises the plurality of buttons, such that a number of buttons corresponds to the range of values of the predefined rating scale. For example, when the predefined rating scale is a star-based scale comprising ten values therein, then the plurality of buttons comprises ten buttons to correspond to the star values. In another example, when the predefined rating scale is an emotion-based scale comprising five values corresponding to: dissatisfied, somewhat-satisfied, satisfactory, good and brilliant, then the plurality of buttons comprises five buttons. It will be appreciated that each button of the plurality of buttons can be fabricated to have any form-factor. For example, when the predefined rating scale is the emotion-based scale as described above, then the plurality of buttons can be fabricated to resemble emoticons corresponding to the five different emotions (or "smileys" or "emojis").

Moreover, the wearable device comprises a Near Field Communication (NFC) unit. The NFC unit can be implemented as an NFC chip that enables near-field communication of a wearable device with another wearable device (or a terminal device, as will be described in detail herein after). The near-field communication can be established between the wearable device and another wearable device (or the terminal device) for detecting interaction between the entities associated therewith. For example, when one wearable device having the NFC unit approaches a communication range of another wearable device having the NFC unit (such as, within four inches or less or each other) or a tap is detected between the wearable devices, the near-field communication can be established between the wearable devices.

Optionally, each wearable device of the at least one wearable device is implemented as a wristband comprising a first portion and a second portion configured to be operatively coupled to each other. The wearable device can be implemented such that each of the first portion and the second portion comprise a pair of arcuate components.

Furthermore, when the first portion and the second portion are connected with each other, they encircle a wrist of a person, enabling the person to conveniently and securely wear the wearable device. In an example, the first portion of the wearable device relates to a portion of the wearable device that encircles a top of the wrist of the person and the second portion of the wearable portion relates to a portion of the wearable device that encircles a bottom of the wrist of the person. Moreover, one end of each of the first portion and the second portion comprises an attachment mechanism for detachable coupling between the first portion and the second portion. Such an attachment mechanism can be implemented as a pair of hooks that is configured to be locked against each other. Furthermore, another end of the first portion comprises a USB connector and another end of the second portion comprises a USB port, wherein the USB port of the second portion is configured to receive the USB connector of the first portion. The USB connector can be implemented as one of: a Mini-A plug, a Mini-B plug, a Micro-A plug, a Micro-B plug, an 8-Pin Lightning connector, a USB Type-C connector and so forth. Correspondingly, the USB port can be implemented as a Mini-A receptacle, a Mini-B receptacle, a Micro-A receptacle, a Micro-B receptacle, an 8-Pin Lightning receptacle, a USB Type-receptacle, thus, enabling electrical and data communication between the first portion and the second portion of the wearable device.

Optionally, the first portion of the wearable device implemented as the wristband comprises the plurality of buttons. The plurality of buttons can be provided on the wearable device along a position most convenient for a user of the wearable device to interact using the plurality of buttons. In an example, the plurality of buttons is provided towards a top and center of the first portion of the wearable device (such as, when the top portion encircles the top of the wrist of the person wearing the wearable device). In another example, the plurality of buttons is provided towards a side of the first portion of the wearable device, such that the plurality of buttons, face towards the person wearing the wearable device, enabling convenient interaction by the person with the plurality of buttons.

Optionally, each button of the plurality of buttons of each wearable device is configured to receive at least two separate inputs. Each button of the plurality of buttons of the wearable device can be implemented to have different shapes or form-factors. In an example, each button is implemented to have a substantially oval shape (or a substantially rectangular shape), such that, a person wearing the wearable device can provide at least two separate inputs using each button. In such an example, the person can press one elongate-end of the oval-shaped button to provide one input and another elongate-end of the oval-shaped button to provide another input. Optionally, the person can provide a third input by pressing a middle of the oval-shaped button. Furthermore, each of the at least two separate inputs, comprises a different rating on the predefined rating scale. For example, when the predefined rating scale corresponds to ten different ratings to be provided and the plurality of buttons comprises five buttons, then the person can press one end of a first button to provide a rating of '1', and press another end of the first button to provide a rating of '2'. Similarly, the person can press one end of a last button to provide a rating of '9' and press another end of the last button to provide a rating of '10'. Alternatively, the at least two separate inputs comprises a rating on the predefined rating scale and an instruction for operation of the mobile device. For example, when the predefined rating scale corresponds to five different ratings and the plurality of buttons comprises five buttons, then the user can press one end of a first button to provide a rating of '1', and press another end of the first button to activate a music-playing app on the mobile phone. Similarly, the user can press one end of a second button to provide a rating of '2', and press another end of the second button to speed-dial an emergency contact.

Optionally, each wearable device comprises a PCB having at least two contacts thereon and each button comprises a contact corresponding to each contact of the at least two contacts on the PCB. Each of the two contacts of the PCB and the button, can be implemented using a black carbon pill. Furthermore, each of the contacts of the button corresponding to each of the at least two contacts of the PCB, is maintained in a disengaged position when the button is not pressed, corresponding to not receiving any input using the button. It will be appreciated that, when the button is not pressed, neither of the two contacts of the button engage against the corresponding contacts of the PCB. Moreover, the contact of the button corresponding to one of the at least two contacts of the PCB, is engaged when the button is pressed along a first direction, corresponding to receiving of one of the two separate inputs and the contact of the button corresponding to another of the at least two contacts of the PCB, is engaged when the button is pressed along a second direction, corresponding to receiving of another of the two separate inputs. As explained hereinabove, each button that is configured to receive at least two separate inputs, can be pressed along two different directions. Correspondingly, when the button is pressed along one of two directions, then a different contact of the button is engaged against the contact of the PCB, thus, enabling the person wearing the wearable device to provide the two separate inputs using each button.

Optionally, the second portion of the wearable device implemented as the wristband comprises a battery, the communication unit, the NFC unit and at least one of: a display, a positioning unit, a step-counting unit, an alerting unit. The battery provided on the second portion enables electrical operation of the wearable device, when the first portion is operatively coupled to the second portion (as described hereinabove). The wearable device can be provided with a miniature display screen on the second portion (such as, along a middle of the second portion) to enable display of information thereon. In an example, the information comprises a recent rating provided using the wearable device, profile of the entity that the rating is provided therefor, a financial value of the interaction (such as, when the interaction corresponds to a monetary transaction) and so forth. In another example, the display can be implemented as one of: an LCD-display, an LED-display, an OLED-display and so forth. Furthermore, the second portion of the wearable device can comprise a positioning unit implemented, for example, as a GPS unit and a step-counting unit implemented, for example, as a pedometer. Moreover, the second portion comprises the altering unit that can be implemented, for example, using a vibrator, one of more LED lights, a speaker or a combination thereof.

Furthermore, each wearable device is associated with a unique device identifier (ID), a unique profile indicative of trust and a class among a predefined set of classes. The term "device ID" as used throughout the present disclosure, relates to a unique alphanumeric (or optionally, alphabetic or numeric) sequence of characters that distinguishes an identity of a device from another device. Such a unique device ID can be associated to a barcode, or a Quick Response code (or QR code) for enabling identification of the wearable device (and the terminal device, as will be described herein after). Moreover, the wearable device is associated with a unique profile indicative of trust. For example, the unique profile of the wearable device can correspond to an account of the entity associated with the wearable device on a digital platform (such as, on a social-media website, an app and so forth). Consequently, activities of the entity on the digital platform are correlated directly to the wearable device as a measure of trust of the wearable device. Additionally, all interactions of the wearable device with other wearable devices (or terminal devices) that can comprise real-world transactions are associated to the entity on the digital platform. It will be appreciated that such an association of all digital activities and real-world transactions of each entity to the unique profile, enables to provide a single and reliable measure of trust associated with the entity.

The wearable device is associated with the class among the predefined set of classes. The term "set of classes" refers to a collection of various groups that each wearable device (and the terminal device) can belong to, based on satisfaction of one or more conditions. In an example, the set of classes comprises five different classes and the conditions comprise having an average rating that corresponds to a particular class. In such an example, the predefined rating scale corresponds to a range of zero to five. Consequently, profiles associated with an average rating between zero and one belong to a first class; between one and two belong to a second class; between two and three belong to a third class; between three and four belong to a fourth class and between four and five belong to a fifth class of the five different classes. Moreover, each subsequent class can correspond to increased trust of the profile as compared to a previous class. Correspondingly, profiles corresponding the second class are associated with an increased trust as compared to corresponding to the first class and profiles corresponding to the fifth class are associated with an increased trust as compared to profiles corresponding to the fourth class. In one example, a first class corresponds to an 'Alert level'; a second class corresponds to a 'Base level'; a third class corresponds to an 'Influencing level'; a fourth class corresponds to a 'Premium level' and a fifth class corresponds to a 'Community level'. In such an example, the Alert level is associated with minimum trust of the five different classes and the Community level is associated with the maximum trust of the five different classes.

Furthermore, the system comprises at least one terminal device. The term "terminal device" as used throughout the present disclosure, relates to a device that is generally associated with an entity being a non-living property. Furthermore, a location of the terminal device may correspond to a fixed location. For example, the non-living property can be a business establishment (such as, a restaurant) and the terminal device can be implemented as a payment processing device that is arranged at a payment counter of the business establishment (such as, with a cashier). The terminal device can be implemented as a Point-of-Sale terminal (such as, a PoS terminal arranged in a supermarket), an automatic vending machine (such as, an automatic ticket vending machine), a payment processing device (such as, a credit card reader) and the like.

It will be appreciated that an entity can be associated with a wearable device, as well as being responsible for a terminal device. For example, when the entity is a non-living property, such as a restaurant, then the restaurant can comprise a terminal device implemented as a payment processing device that is arranged at a payment counter of the restaurant. Furthermore, a cashier can be responsible for the terminal device. However, the casher can be associated with a wearable device of their own. In such an example, interactions of wearable device of the cashier with another wearable device (such as, a wearable device worn by a patron of the restaurant) will be correlated to the profile of the cashier (such that, the interactions may correspond to social transactions of the cashier with the patrons). However, interactions of the terminal device that the cashier is responsible therefor on behalf of the restaurant with a wearable device (such as, a wearable device worn by a patron of the restaurant) will be correlated to the profile of the restaurant.

The terminal device comprises a communication unit and a NFC unit. Furthermore, each terminal device is associated with a unique device ID, a unique profile indicative of trust and a class among the predefined set of classes. The terms "communication unit", "NFC unit", "unique device ID", "unique profile" and "set of classes" are to be understood, as defined above with respect to the at least one wearable device.

The system comprises a server arrangement communicatively coupled to each of the at least one wearable device and the at least one terminal device using the communication unit thereof. The term "server arrangement" as used throughout the present disclosure, relates to an arrangement of hardware components communicatively coupled to the at least one wearable device and the at least one terminal device using a wired or wireless data communication network. The hardware components comprising the server arrangement can be implemented as servers, such that the server comprises a collection of hardware and software components in a client-server relationship that respond to requests for information or services by other hardware and software components (such as, a client) on the data communication network. It will be appreciated that the server arrangement can be implemented in a decentralized architecture. Optionally, the server arrangement is implemented using cloud-computing servers.

Optionally, the system further comprises a mobile device configured to be communicatively coupled to the communication unit of the wearable device using a short-range communication network, wherein the server arrangement is communicatively coupled to the wearable device via the corresponding mobile device. The mobile device can be implemented as a smartphone, a tablet computer, a personal digital assistant (or PDA), a laptop computer and so forth. The mobile device acts as an intermediary between the server arrangement and the wearable device, allowing transmission of information from/to the wearable device to/from the server arrangement. Optionally, the short-range communication network is implemented using a Bluetooth network and the long-range communication network is implemented using 5G network. Thus, the mobile device is communicatively coupled to the wearable device using the Bluetooth network and the mobile device transmits information received from the wearable device to the server arrangement using the 5G communication network.

Optionally, the communication unit of each wearable device of the at least one wearable device is implemented using a first communication unit configured to be communicatively coupled to the mobile device using the short-range communication network and/or a second communication unit configured to be communicatively coupled to the server arrangement using a long-range communication network. The wearable device can comprise the first communication unit that is configured to be communicatively coupled to the mobile device using the short-range communication network (such as, the Bluetooth network). The first communication unit enables transmission of the information from the wearable device to the server arrangement by employing one or more data communication functions of the mobile device (such as, providing transmission of information using a 4G communication network, 5G communication network, the Internet, and so forth), enable robust transmission of the information via the mobile device. Furthermore, the wearable device can comprise the second communication unit that is configured to be communicatively coupled directly to the server arrangement using the long-range network. The second communication unit enables transmission of the information directly from the wearable device to the server arrangement using a particular data communication network (such as, the 5G communication network), thus, ensuring reliable transmission of the information even when the data communication network associated with the mobile device is unavailable.

The server arrangement comprises a blockchain network having a block for each unique profile and the blockchain network is configured to store a ledger comprising at least activity information for the profile. The server arrangement comprises the blockchain network, such that the blockchain network is implemented as a network of blocks. Moreover, each unique profile corresponding to the at least one wearable device and the at least one terminal device comprises a block dedicated thereto within the blockchain network. The block comprises one or more data nodes comprising identity structure corresponding to the profile. The term "identity structure" as used throughout the present disclosure, comprises information corresponding to the profile, including but not limited to, information associated with the entity that the profile belongs thereto, the device ID of the wearable device and/or the terminal device associated with the entity and so forth. The blockchain comprises the ledger that comprises the activity information. The ledger is configured to store the identity structure for each profile and the identity structure stores transaction logs for each interaction of the wearable device and/or the terminal device corresponding to the profile. The term "activity information" as used throughout the present disclosure, relates to information associated with an impact of the rating provided by the wearable device on a profile of another wearable device or terminal device, on the profile associated therewith. Such activity information can comprise, for example, a location of interaction between the two wearable devices or the wearable device and the terminal device associated with the interaction, a purpose of interaction, the rating provided by each entity for the other entity and the like. The transaction logs are stored in the ledger along with relationship information between the entities corresponding to the wearable device and the terminal device and/or transaction information between the entities corresponding to the wearable device and the terminal device and/or transaction (as will be described hereinafter). Optionally, each block is associated with a dedicated storage node that enables information stored therein to be directly stored, accessed and/or shared. It will be appreciated that such a dedicated storage node enables to improve processing speed associated with such storing, accessing or sharing of information from each block of the blockchain network.

Furthermore, various interactions of a wearable device associated with the entity, with other wearable devices or terminal devices, are recorded using smart contracts. The term "smart contract" refers to code that self-executes on fulfillment of certain specific conditions on the blockchain network. The smart contracts enable automatic management of trust associated with the profile, based on completion of an interaction between a wearable device with another wearable device or a terminal device.

The server arrangement is configured to determine occurrence of a first type of event between a wearable device and another wearable device of the at least one wearable device or a second type of event between the wearable device of the at least one wearable device and a terminal device of the at least one terminal device. It will be appreciated that, when a wearable device interacts with another wearable device, such as, by the NFC units associated therewith coming in data communication range of each other, data is generated by each of the wearable device corresponding to the interaction. Such data is transmitted by each of the wearable devices involved in the interaction to the server arrangement via the communication unit associated with the wearable devices. Subsequently, the server arrangement determines occurrence of the first type of event between the two wearable devices involved in the interaction. Similarly, when a wearable device interacts with a terminal device, data that is generated by each of the wearable device and the terminal device involved in the interaction is transmitted via the corresponding communication units to the server arrangement. Consequently, the server arrangement determined occurrence of the second type of event between the wearable device and the terminal device.

The server arrangement receives the device ID and the class of each of the at least one wearable device and the at least one terminal device, based on the type of event. It will be appreciated that, when the server arrangement determines the type of event to be the first type of event, the server arrangement receives the device ID and the class of each wearable device involved in the interaction. However, when the server arrangement determines the type of event to be the second type of event, the server arrangement determines the type of event to be the second type of event.

Thereafter, the server arrangement receives a rating provided by the wearable device for the other wearable device or the terminal device based on the type of event. It will be appreciated that, when the type of event is determined to be the first type of event, each wearable device provides a rating to the other wearable device involved in the interaction, using one or more of the plurality of buttons provided thereon. Consequently, the server arrangement receives the rating provided by each wearable device for the other wearable device. However, when the type of event is determined to be the second type of event, then only the wearable device involved in the interaction provided the rating for the terminal device.

Optionally, the server arrangement is further configured to transmit a one-time password (OTP) to the mobile device for authenticating the wearable device, upon determining the occurrence of the event and subsequently, receive an input in response to transmission of the OTP from the mobile device or the wearable device for authenticating the wearable device. The OTP can be a unique alphanumeric sequence of characters can be transmitted to the mobile device that is communicatively coupled to the wearable device. Subsequently, a person wearing the wearable device is required to input the OTP as the response for authenticating the wearable device. Optionally, the OTP forms a password or a private-key (such that, the private-key is an encrypted key) and an identifier associated with the profile (such as, a 'profile name') is used as a public-key for authenticating the wearable device. The response can be provided by the person by inputting the public-key and private-key using the mobile device or alternatively, the private-key can be inputted using the plurality of buttons provided on the wearable device (such that, the plurality of buttons corresponds to numbers 0, 1, 2, 3, 4, 5, 6, 7, 8, and 9 and the OTP comprises a numeric sequence of characters). Such a private-key inputted using the plurality of buttons provided on the wearable device, enables a faster and more reliable authentication of the wearable device. Thereafter, the server arrangement receives the rating provided by the wearable device for generating the updated activity information upon successful authentication of the wearable device, or deny the rating provided by the wearable device upon unsuccessful authentication of the wearable device. It will be appreciated that, if the input received in response to transmission of the OTP, accurately corresponds to the transmitted OTP, then the wearable device is successfully authenticated and the rating is received. Alternatively, if the input received is different, then the authentication of the wearable device is deemed to be unsuccessful. Optionally, a predefined number of attempts are allowed to successfully authenticate the wearable device by inputting the OTP. In an example, the predefined number of attempts is three attempts. Such an authentication of the wearable device using the OTP, further enables verification of the identity structure associated with the block (of the blockchain network) corresponding to the wearable device. Optionally, each identity structure is verified using the private-key and smart contract associated with the bloc, thus, ensuring transparency, security and anonymity associated with the block.

Subsequently, the server arrangement processes the rating to generate updated activity information for the profile corresponding to each of the wearable device, and the other wearable device or the terminal device based on the type of event. The updated activity information is generated using a weighted average of the provided rating and the corresponding class of the at least one wearable device and the at least one terminal device. The server arrangement receives the rating provided by a first wearable device for a second wearable device involved in the transaction, when the type of event is determined to be the first type of event, and uses the class of the second wearable device to generate the updated activity information for the second wearable device. Such an updated activity information is generated as a weighted average of the rating provided by the first wearable device for the second wearable device, by using the class of the second wearable device as a weighting factor. Similarly, when the second wearable device provides a rating for the first wearable device, the updated activity information for the first wearable device is generated as the weighted average of the rating provided by the second wearable device, while employing the class of the first wearable device as the weighting factor.

Moreover, when the type of event is determined to be the second type of event, the updated activity information for each of the wearable device and the terminal device involved in the interaction, is generated as a weighted average of the rating provided by the wearable device, and using the class of the wearable device and the terminal device as the weighting factor. For example, the updated activity information for each of the wearable device and the terminal device is generated by using the rating provided by the wearable device for the terminal device, and using the weighting factor as an average of the class that each of the wearable device and the terminal device belongs to. It will be appreciated that in such an example, the updated activity information for each of the wearable device and the terminal device exhibits a similar (or same) change, based on the rating provided by the wearable device.

The server arrangement updates the profile on the ledger of the blockchain network with the updated activity information for each of the wearable device, and the other wearable device or the terminal device based on the type of event. The server arrangement acts as a third-party platform between the two wearable devices during the first type of event or between the wearable device and the terminal device during the second type of event, to verify the blockchain transaction between the corresponding wearable devices or the wearable device and the terminal device (such that, the blockchain transaction is associated with the generated updated activity information). The blockchain transaction that is verified by the server arranged is determined to not be a duplicate transaction and is subsequently, added to the ledger, thereby improving reliability and confidence associated with the information on the blockchain network. The server arrangement verifies the blockchain transaction by digitally signing the blockchain transaction with a unique hash value. Such a hash value associated with each blockchain transaction is further verified either manually or automatically (such as, by using an artificial intelligence agent) to verify the transaction.

Optionally, the ledger further comprises relation information corresponding to a relation of the wearable device with another wearable device of the at least one wearable device or a terminal device of the at least one terminal device and transaction information associated with each event determined for the wearable device or the terminal device. As explained herein above, each wearable device and each terminal device corresponds to an entity and such entities can have relations between the entities. For example, entities associated with two different wearable devices may have a connection between the entities on a digital platform, such as, being friends on a social-media website. In such an example, the relation information for each of the two wearable devices corresponding to the other wearable device may comprise a device ID of the other wearable device, a time and date of first interaction between the entities, a type of interaction between the entities, a time and date of a most recent interaction between the entities, and so forth. In another example, an entity associated with a wearable device may be a patron of another entity associated with a terminal device that may be a business establishment. Furthermore, the ledger comprises transaction information associated with each event determined for the wearable device or the terminal device. The transaction information can comprise information corresponding to, for example, a monetary value of the transaction (such as, when the transaction involves a product or service requiring payment of money), a type of a product or service associated with the transaction, details of the product or service associated with the transaction and so forth.

Optionally, each blockchain transaction is associated with a timestamp value, such that a hash value includes a timestamp of a previous blockchain transaction therein. Consequently, a chain of blockchain transactions is created, such that any hash value refers to timestamps of previous blockchain transactions. Thus, a plurality of blockchain transactions are hashed together, thereby, improving scalability of the blockchain network. In an example, the plurality of blockchain transactions are hashed together using Merkle tree algorithm. Moreover, a longest chain of verified hash values (and blockchain transactions) is considered as a majority decision, thus, improving reliability and security associated with storage of information in the blockchain network.

The server arrangement allocates an incentive for the profile corresponding to the at least one wearable device and/or the at least one terminal device, based on the updated activity information thereof. The term "incentive" as used throughout the present disclosure, refers to a digital or real-world benefit that is endowed upon the entity associated with the wearable device or the terminal device, based upon the updated activity information of the profile. For example, a digital benefit allocated to a profile can comprise, a discount for availing an offer or making available a premium web-based service for free (such as, to a web-based service that accepts only a limited number of participants), access to a restricted (members-only) community and the like. Similarly, the real-world incentive can comprise allowing access to a premium product or service for a reduced price or providing an invitation to an exclusive membership (such as, an exclusive club of patrons at a business establishment), reduction in waiting time for purchasing a product or availing a service, improved quality of services that are provided access thereto and the like.

In exemplary operation, the system can be implemented within a hospitality business establishment, such as, a restaurant. In such an example, various patrons and staff members of the restaurant can wear the wearable device and subsequent to each interaction, provide a rating Consequently, the profile of each patron and staff member of the restaurant is updated with the updated activity information and an incentive is allocated therefor. Such an incentive can comprise, a free meal at the restaurant, a discounted service at the restaurant, access to a premium-membership at the restaurant and so forth. Optionally, a rating is received by each patron of the restaurant for a terminal device associated with the restaurant, thereby, allowing management of trust for the restaurant, the various staff members working for the restaurant as well as various patrons associated with the restaurant. In another exemplary operation, the system can be implemented in a hospital and correspondingly, updated activity information is generated for various patients visiting the hospital and/or various doctors and other medical or non-medical professionals working at the hospital. Consequently, an incentive is allocated for each of the patients, doctors and other medical or non-medical professionals working at the hospital. In yet another exemplary operation, the system can be implemented in a school and updated activity information is generated for a plurality of students associated with the school, as well as academic and non-academic staff members associated with the school. Similarly, the system can be implemented in various governmental and non-governmental institutions, such as, to manage trust associated with professionals employed therein.

In other exemplary operation, the system can be implemented in non-permanent scenarios, such as, in social gatherings. In such an example, the system can be employed to determine and update, in real-time or near real-time, the trust associated with various attendees of the social gathering. For example, the social gathering is a concert and the wearable device is worn by each attendee of the concert, as well as, personnel responsible for organization of the concert. The attendees of the concert provide rating for other attendees, enabling determination of potentially suspicious attendees therein, further ensuring safety and security within the concert. Similarly, the attendees can provide ratings for the various personnel, enabling determination of professional behavior thereof in a convenient, quantifiable and reliable manner.

Optionally, each profile is associated with a weight and the transaction information comprises information of a positive or a negative behavior corresponding to each event. The term "weight" as used throughout the present disclosure, relates to a numerical score corresponding to the profile that is impacted directly or indirectly by the rating received during various transactions. The server arrangement is further configured to increase the weight associated with the profile, when the transaction information corresponds to the positive behavior and decrease the weight associated with the profile, when the transaction information corresponds to the negative behavior. The positive behavior can include, for example, forming relations with entities associated with other profiles, providing information on the digital platform that the profile is hosted thereon, availing services provided by business establishments, joining communities of entities, receiving good ratings on a consistent basis, maintaining a position in one of the higher classes for an extended duration and the like. The negative behavior can include, for example, disassociating with entities corresponding to other profiles, providing false information on digital platforms, reserving services with business establishments but not availing them, receiving bad ratings on a consistent basis, maintaining a position in the lowest class for an extended duration and the like. Optionally, one or more classes of the set of classes can serve as a threshold class. Furthermore, profiles belonging to classes below the threshold class for more than a predefined duration may be provided a penalty, such as, reduction in ratings received therefor by a predefined factor (such as, by ten percent or twenty-five percent) or the profiles can be removed from the system.

Optionally, the server arrangement uses the weight associated with each profile as a threshold value, for allocating the incentive to the profile. For example, when the weight is a numerical score between one and hundred, the threshold value can be fifty. In such an example, the server arrangement only allocates incentives to profiles that have the weight above fifty or more.

Moreover, the present description also relates to the method as described above. The various embodiments and variants disclosed above apply mutatis mutandis to the method.

Optionally, the ledger further comprises relation information corresponding to a relation of the wearable device with another wearable device of the at least one wearable device or a terminal device of the at least one terminal device and transaction information associated with each event determined for the wearable device or the terminal device.

Optionally, each profile is associated with a weight and the transaction information comprises information of a positive or a negative behavior corresponding to each event. The method further comprises increasing the weight associated with the profile, when the transaction information corresponds to the positive behavior and decreasing the weight associated with the profile, when the transaction information corresponds to the negative behavior.

Optionally, the method further comprises transmitting a one-time password (OTP) for authenticating the wearable device, upon determining the occurrence of the event. Furthermore, the method comprises receiving an input in response to transmission of the OTP for authenticating the wearable device and receiving the rating provided by the wearable device for generating the updated activity information upon successful authentication of the wearable device, or denying the rating provided by the wearable device upon unsuccessful authentication of the wearable device.

DETAILED DESCRIPTION OF THE DRAWINGS

Referring to FIG. 1, there is shown a block diagram of a system 100 for managing trust, in accordance with an embodiment of the present disclosure. The system 100 comprises at least one wearable device $102_1$-$102_n$ and at least one terminal device $104_1$-$104_n$. Furthermore, the system 100 comprises a server arrangement 106 communicatively coupled to each of the at least one wearable device $102_1$-$102_n$ and the at least one terminal device $104_1$-$104_n$.

FIG. 1 is merely an example, which should not unduly limit the scope of the claims herein. It is to be understood that the simplified illustration of the system 100 for managing trust is provided as an example and is not to be construed as limiting the system 100 to specific numbers, types, or arrangements of the wearable device, the terminal device and the server arrangement. A person skilled in the art will recognize many variations, alternatives, and modifications of embodiments of the present disclosure.

Figure 2:
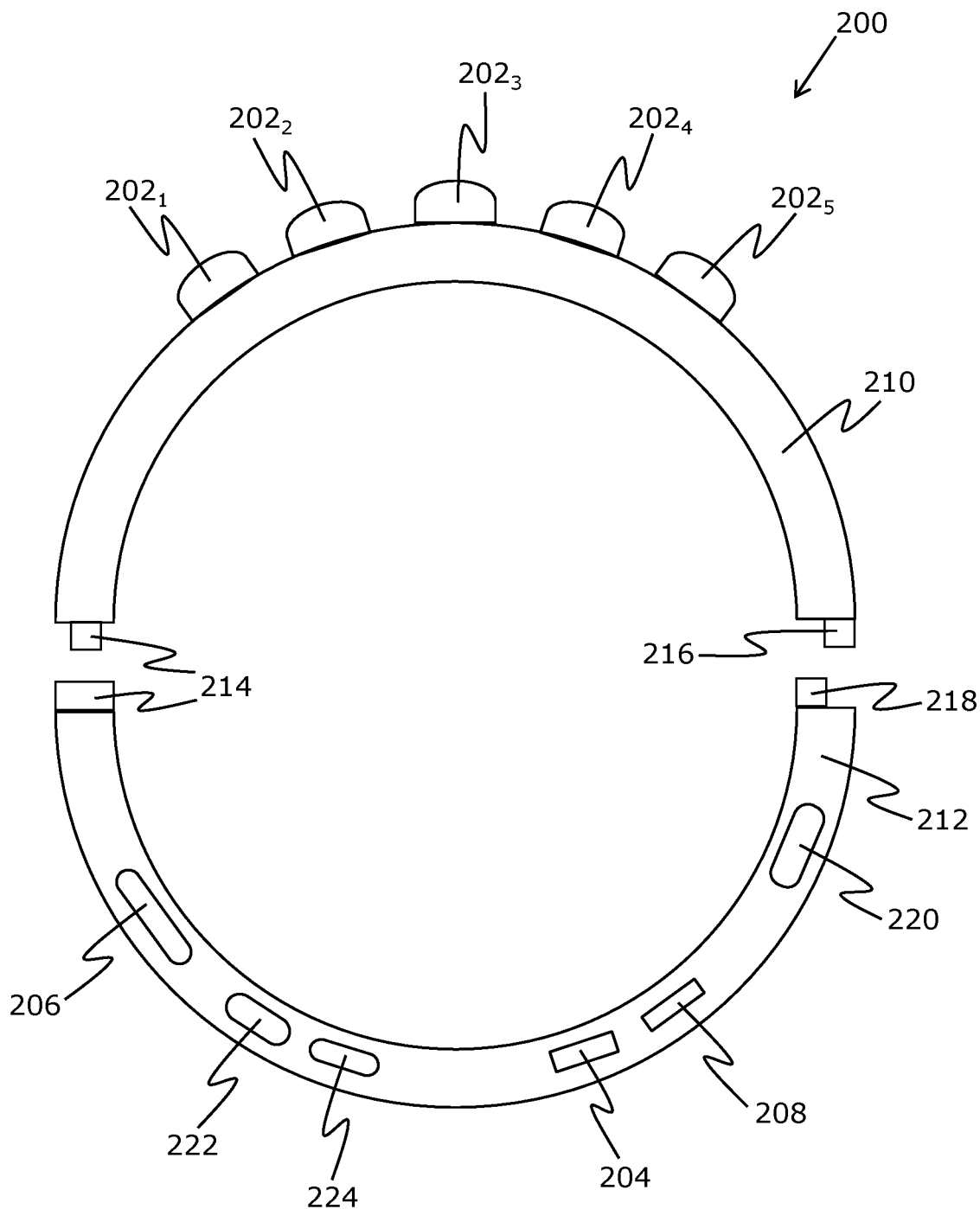
FIGS. 2 and 3 show a front-view of a wearable device, in accordance with different embodiments of the present disclosure.

Referring to FIG. 2, there is shown a front-view of a wearable device 200 (such as, a wearable device of the at least one wearable device $102_1$-$102_n$ of FIG. 1), in accordance with an embodiment of the present disclosure. The wearable device 200 comprises a communication unit, a plurality of buttons $202_1$-$202_5$ for providing a rating as per a predefined rating scale and a Near Field Communication (NFC) unit 204. The communication unit is implemented using a first communication unit 206 (such as, a Bluetooth transceiver) and a second communication unit 208 (such as, a SIM-card slot). The wearable device 200 is implemented as a wristband comprising a first portion 210 and a second portion 212 configured to be operatively coupled to each other. As shown, the first portion 210 and the second portion 212 are detached from each other. Furthermore, one end of each of the first portion 210 and the second portion 212 comprises an attachment mechanism 214 for detachable coupling between the first portion and the second portion and another end of the first portion 210 comprises a USB connector 216 and another end of the second portion 212 comprises a USB port 218. The USB port 218 of the second portion 212 is configured to receive the USB connector 216 of the first portion 210. Moreover, the second portion 212 comprises a battery 220, a positioning unit 222 (such as, a GPS transceiver) and a step-counting unit 224 (such as, a pedometer).

Figure 3:
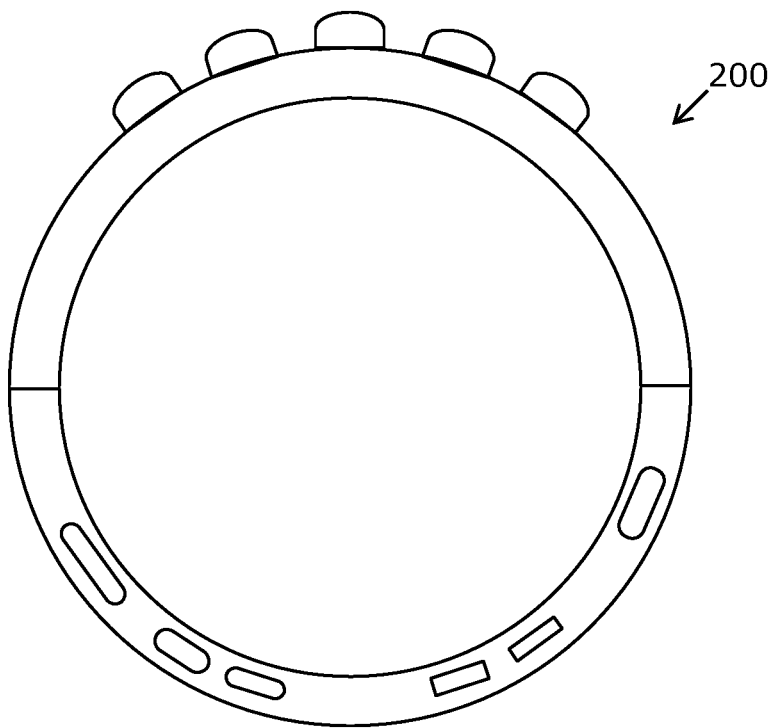

Referring to FIG. 3, there is shown a front-view of the wearable device 200 of FIG. 2, in accordance with another embodiment of the present disclosure. As shown, the first portion 210 and the second portion 212 are attached to each other through attachment of the attachment mechanism 214, as well as the USB connector 216 of the first portion 210 with the USB port 218 of the second portion 212.

Figure 4:
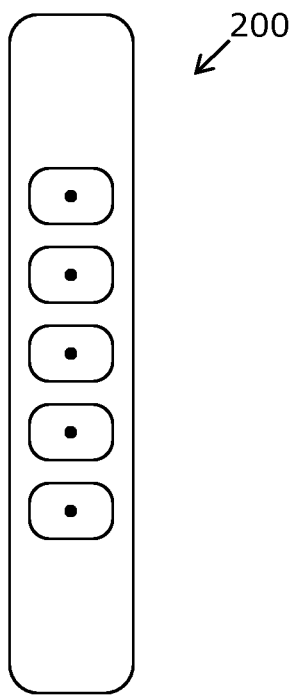
FIG. 4 is a top-view of the wearable device of FIG. 2, in accordance with an embodiment of the present disclosure.

Referring to FIG. 4, there is shown a top-view of the wearable device 200 of FIG. 2, in accordance with an embodiment of the present disclosure.

Figure 5:
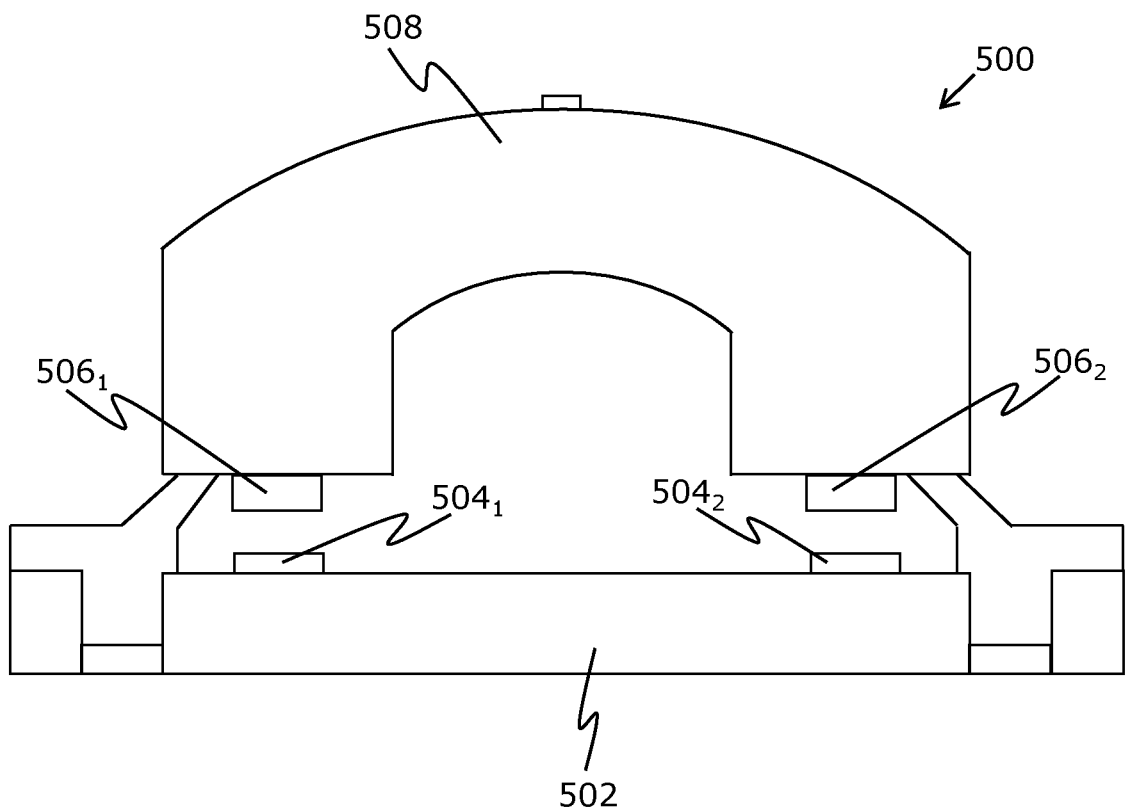
FIG. 5 is a schematic illustration of a button of a plurality of buttons of a wearable device, in accordance with an embodiment of the present disclosure.

Referring to FIG. 5, there is shown a schematic illustration of a button 500 of a plurality of buttons (such as, the plurality of buttons $202_1$-$202_5$ of FIG. 2) of a wearable device (such as, the wearable device 200 of FIG. 2), in accordance with an embodiment of the present disclosure. As shown, the wearable device comprises a PCB 502 having at least two contacts $504_1$-$504_2$ thereon and the button 500 comprises a contact $506_1$-$506_2$ corresponding to each contact of the at least two contacts $504_1$-$504_2$ on the PCB 502. As shown, each of the contacts $506_1$-$506_2$ of the button 502 corresponding to each of the at least two contacts $504_1$-$504_2$ of the PCB 502, is maintained in a disengaged position, as the button 500 is not pressed. Furthermore, the 500 comprises a silicone (or rubber) cap 508 and a keypad web/elasticity wall (not shown).

Figure 6:
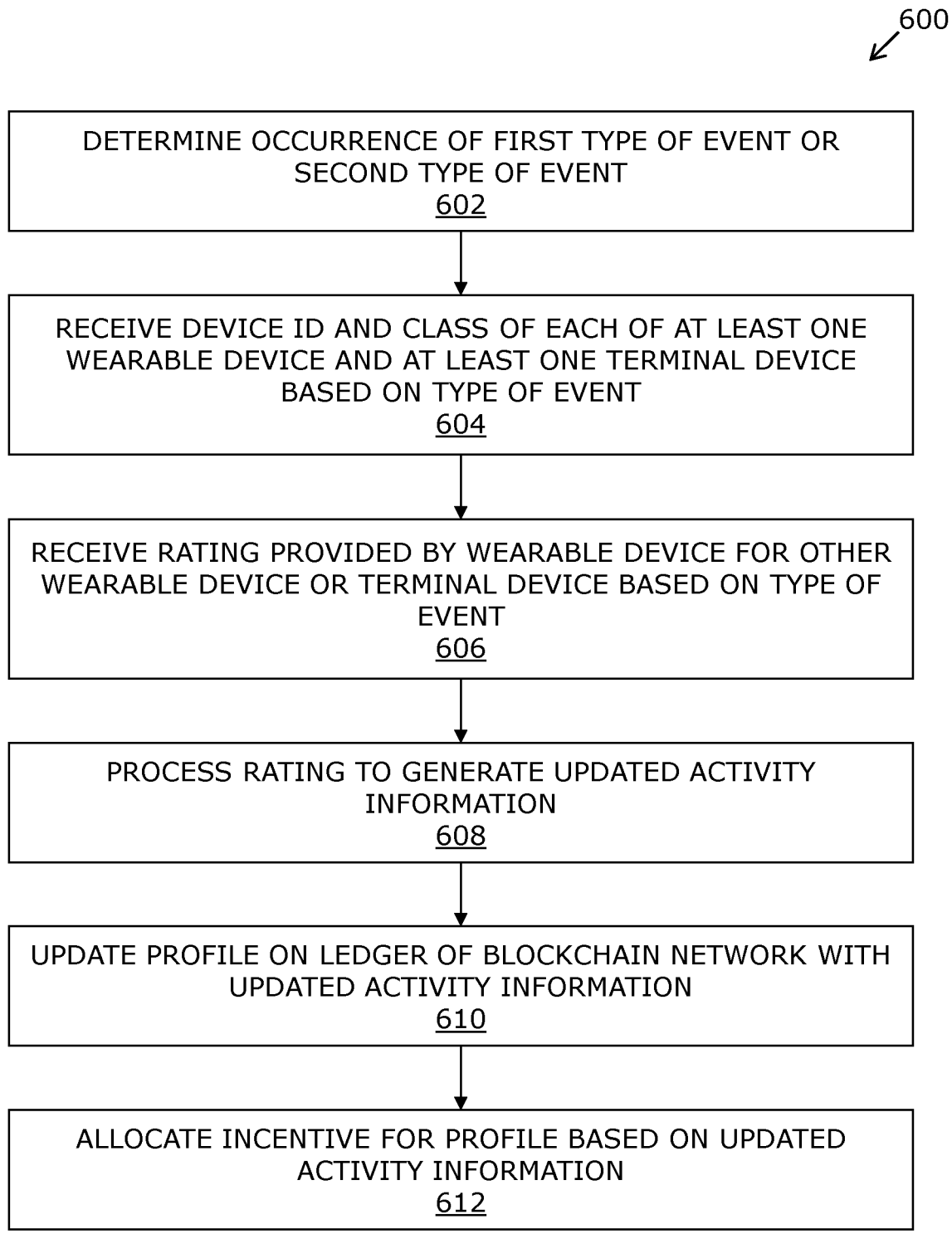
FIG. 6 is an illustration of steps of a method of managing trust, in accordance with an embodiment of the present disclosure.

Referring to FIG. 6, illustrated are steps of a method 600 of managing trust, in accordance with an embodiment of the present disclosure. The method 600 relates to managing trust in a system comprising at least one wearable device and at least one terminal device. Furthermore, each of the at least one wearable device and the at least one terminal device is associated with a unique device identifier (ID), a unique profile indicative of trust and a class among a predefined set of classes. The system is implemented using a blockchain network having a block for each unique profile and the blockchain network is configured to store a ledger comprising at least activity information for the profile. At a step 602, occurrence of a first type of event between a wearable device and another wearable device of the at least one wearable device or a second type of event between the wearable device of the at least one wearable device and a terminal device of the at least one terminal device is determined. At a step 604, the device ID and the class of each of the at least one wearable device and the at least one terminal device is received based on the type of event. At a step 606, a rating provided by the wearable device for the other wearable device or the terminal device is received based on the type of event. At a step 608, the rating is processed to generate updated activity information for the profile corresponding to each of the wearable device, and the other wearable device or the terminal device based on the type of event. The updated activity information is generated using a weighted average of the provided rating and the corresponding class of the at least one wearable device and the at least one terminal device. At a step 610 the profile is updated on the ledger of the blockchain network with the updated activity information for each of the wearable device, and the other wearable device or the terminal device based on the type of event. At a step 612, an incentive is allocated for the profile corresponding to the at least one wearable device and/or the at least one terminal device, based on the updated activity information thereof The steps 602, 604, 606, 608, 610 and 612 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for managing trust, the system comprising:
   at least one wearable device comprising a communication unit,
   a plurality of buttons for providing a rating as per a predefined rating scale and a Near Field Communication (NFC) unit, wherein each wearable device is associated with a unique device identifier (ID), a unique profile indicative of trust and a class among a predefined set of classes;
   at least one terminal device comprising a communication unit and a NFC unit, wherein each terminal device is associated with a unique device ID, a unique profile indicative of trust and a class among the predefined set of classes;

a server arrangement communicatively coupled to each of the at least one wearable device and the at least one terminal device using the communication units of the at least one wearable device and the at least one terminal device thereof, wherein the server arrangement comprises a blockchain network having a block for each unique profile and the blockchain network is configured to store a ledger comprising at least activity information for each profile, and wherein the server arrangement is configured to:

determine occurrence of a first type of event between a wearable device and another wearable device of the at least one wearable device or a second type of event between the wearable device of the at least one wearable device and a terminal device of the at least one terminal device;

receive the device ID and the class of each of the at least one wearable device and the at least one terminal device based on the type of event;

receive a rating provided by the wearable device for the other wearable device or the terminal device based on the type of event;

process the rating to generate updated activity information for the profile corresponding to each of the wearable device, and the other wearable device or the terminal device based on the type of event, wherein the updated activity information is generated using a weighted average of the provided rating and the corresponding class of the at least one wearable device and the at least one terminal device;

update the profile on the ledger of the blockchain network with the updated activity information for each of the wearable device, and the other wearable device or the terminal device based on the type of event; and allocate an incentive for the profile corresponding to the at least one wearable device and/or the at least one terminal device, based on the updated activity information thereof, wherein the ledger further comprises relation information corresponding to a relation of the wearable device with another wearable device of the at least one wearable device or a terminal device of the at least one terminal device and transaction information associated with each event determined for the wearable device or the terminal device, wherein each profile is associated with a weight and the transaction information comprises information of a positive or a negative behavior corresponding to each event, wherein the incentive allocated for each profile is further based on whether the weight associated with the corresponding profile has reached a predefined threshold, and wherein the server arrangement is further configured to:

increase the weight associated with the profile, when the transaction information corresponds to the positive behavior; and decrease the weight associated with the profile, when the transaction information corresponds to the negative behavior.

2. The system according to claim 1, further comprising a mobile device configured to be communicatively coupled to the communication unit of the wearable device using a short-range communication network, wherein the server arrangement is communicatively coupled to the wearable device via the corresponding mobile device.

3. The system according to claim 2, wherein each button of the plurality of buttons of each wearable device is configured to receive at least two separate inputs and wherein each of the at least two separate inputs, comprises: a different rating on the predefined rating scale; or a rating on the predefined rating scale and an instruction for operation of the mobile device.

4. The system according to claim 2, wherein the server arrangement is further configured to: transmit a one-time password (OTP) to the mobile device for authenticating the wearable device, upon determining the occurrence of the first type of event or the second type of event; receive an input in response to transmission of the OTP from the mobile device or the wearable device for authenticating the wearable device; and receive the rating provided by the wearable device for generating the updated activity information upon successful authentication of the wearable device, or deny the rating provided by the wearable device upon unsuccessful authentication of the wearable device.

5. The system according to claim 2, wherein the communication unit of each wearable device of the at least one wearable device is implemented using: a first communication unit configured to be communicatively coupled to the mobile device using the short-range communication network; and/or a second communication unit configured to be communicatively coupled to the server arrangement using a long-range communication network.

6. The system according to claim 5, wherein the short-range communication network is implemented using a Bluetooth network and the long-range communication network is implemented using 5G communication network.

7. The system according to claim 1, wherein each wearable device of the at least one wearable device is implemented as a wristband comprising a first portion and a second portion configured to be operatively coupled to each other, and wherein: one end of each of the first portion and the second portion comprises an attachment mechanism for detachable coupling between the first portion and the second portion; and another end of the first portion comprises a USB connector and another end of the second portion comprises a USB port, wherein the USB port of the second portion is configured to receive the USB connector of the first portion.

8. The system according to claim 7, wherein the first portion of the wearable device implemented as the wristband comprises the plurality of buttons.

9. The system according to claim 8, wherein each wearable device comprises a Printed Circuit Board (PCB) having at least two contacts thereon and each button comprises a contact corresponding to each contact of the at least two contacts on the PCB, and wherein: each of the contacts of the button corresponding to each of the at least two contacts of the PCB, is maintained in a disengaged position when the button is not pressed, corresponding to not receiving any input using the button; the contact of the button corresponding to one of the at least two contacts of the PCB, is engaged when the button is pressed along a first direction, corresponding to receiving of one of the two separate inputs; and the contact of the button corresponding to another of the at least two contacts of the PCB, is engaged when the button is pressed along a second direction, corresponding to receiving of another of the two separate inputs.

10. The system according to claim 7, wherein the second portion of the wearable device implemented as the wristband comprises a battery, the communication unit, the NFC unit and at least one of: a display, a positioning unit, a step-counting unit, an alerting unit.

11. A method for managing trust in a system comprising at least one wearable device and at least one terminal device,
- wherein each of the at least one wearable device and the at least one terminal device is associated with a unique device identifier (ID),
- a unique profile indicative of trust and a class among a predefined set of classes, and
- wherein the system is implemented using a blockchain network having a block for each unique profile and the blockchain network is configured to store a ledger comprising at least activity information for each profile and wherein the method comprises:
- determining occurrence of a first type of event between a wearable device and another wearable device of the at least one wearable device or a second type of event between the wearable device of the at least one wearable device and a terminal device of the at least one terminal device;
- receiving the device ID and the class of each of the at least one wearable device and the at least one terminal device based on the type of event;
- receiving a rating provided by the wearable device for the other wearable device or the terminal device based on the type of event;
- processing the rating to generate updated activity information for the profile corresponding to each of the wearable device, and the other wearable device or the terminal device based on the type of event, wherein the updated activity information is generated using a weighted average of the provided rating and the corresponding class of the at least one wearable device and the at least one terminal device;
- updating the profile on the ledger of the blockchain network with the updated activity information for each of the wearable device, and the other wearable device or the terminal device based on the type of event; and
- allocating an incentive for the profile corresponding to the at least one wearable device and/or the at least one terminal device, based on the updated activity information thereof,
- wherein the ledger further comprises relation information corresponding to a relation of the wearable device with another wearable device of the at least one wearable device or a terminal device of the at least one terminal device and transaction information associated with each event determined for the wearable device or the terminal device,
- wherein each profile is associated with a weight and the transaction information comprises information of a positive or a negative behavior corresponding to each event, wherein the incentive allocated for each profile is further based on whether the weight associated with the corresponding profile has reached a predefined threshold,
- and wherein the method further comprises:
- increasing the weight associated with the profile, when the transaction information corresponds to the positive behavior; and
- decreasing the weight associated with the profile, when the transaction information corresponds to the negative behavior.

12. The method according to claim 11, wherein the method further comprises: transmitting a one-time password (OTP) for authenticating the wearable device, upon determining the occurrence of the first type of event or the second type of event; receiving an input in response to transmission of the OTP for authenticating the wearable device; and receiving the rating provided by the wearable device for generating the updated activity information upon successful authentication of the wearable device, or denying the rating provided by the wearable device upon unsuccessful authentication of the wearable device.

* * * * *